(12) United States Patent
Orgill et al.

(10) Patent No.: US 9,601,157 B2
(45) Date of Patent: Mar. 21, 2017

(54) METHODS AND APPARATUS FOR REMOTE MOTION GRAPHICS AUTHORING

(76) Inventors: Mark S. Orgill, Laguna Beach, CA (US); Michael G. Orgill, Laguna Beach, CA (US); David G. Kayo, Corona, CA (US); Mugen Suzuki, Marina Del Rey, CA (US); Steven Shaun McIntyre, Encinitas, CA (US)

( * ) Notice: Subject to any disclaimer, the term of this patent is extended or adjusted under 35 U.S.C. 154(b) by 2354 days.

(21) Appl. No.: 11/751,484

(22) Filed: May 21, 2007

(65) Prior Publication Data

US 2007/0277108 A1 Nov. 29, 2007

Related U.S. Application Data

(60) Provisional application No. 60/802,422, filed on May 21, 2006.

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G11B 27/034 | (2006.01) |

(52) U.S. Cl.
CPC .......... *G11B 27/034* (2013.01); *G06F 17/248* (2013.01)

(58) Field of Classification Search
CPC ......... G06F 17/30017; G06F 17/30038; G06F 17/212; G06F 17/24; G06F 17/248
USPC ........................................ 715/202, 730, 201
See application file for complete search history.

(56) References Cited

U.S. PATENT DOCUMENTS

| | | | |
|---|---|---|---|
| 5,307,456 A | 4/1994 | MacKay | |
| 5,519,828 A | 5/1996 | Rayner | |

(Continued)

OTHER PUBLICATIONS

Cunningham et al., U.S. Appl. No. 60/790,569, Apr. 10, 2006.*

(Continued)

*Primary Examiner* — Manglesh M Patel
*Assistant Examiner* — Nicholas Hasty
(74) *Attorney, Agent, or Firm* — Barcelo, Harrison & Walker, LLP (57) ABSTRACT

Network-accessible services that provide post-production digital compositing and motion graphics authoring to users who provide their own core content, which the services supplement via a user-driven interface through the inclusion of digital still images, artwork, video, sound, and/or other supplemental content selected by the user. In one embodiment, following selection and sequencing of the various core and supplemental content components, the services automatically generate and make available to a user a finished product that integrates core and supplemental content. To simplify the compositing task, a series of pre-formatted motion graphics video templates may be made available. The end product provided by aspects of the present invention may be a professional-quality ensemble motion graphics video production that may be delivered in any popular format, such as AVI, JPEG, MPEG4 and the like to the customer and or to selected recipients via download or common carrier.

3 Claims, 9 Drawing Sheets

(56) References Cited

U.S. PATENT DOCUMENTS

| | | | |
|---|---|---|---|
| 5,826,102 | A | 10/1998 | Escobar |
| 5,852,435 | A * | 12/1998 | Vigneaux et al. ............ 345/428 |
| 6,029,194 | A | 2/2000 | Tilt |
| 6,320,600 | B1 | 11/2001 | Smith |
| 6,374,260 | B1 | 4/2002 | Hoffert |
| 6,496,980 | B1 | 12/2002 | Tillman |
| 6,615,212 | B1 | 9/2003 | Dutta |
| 6,628,303 | B1 | 9/2003 | Foreman |
| 6,870,547 | B1 * | 3/2005 | Crosby et al. ................ 345/619 |
| 6,976,028 | B2 | 12/2005 | Fenton |
| 7,073,127 | B2 | 7/2006 | Zhao |
| 7,181,081 | B2 | 2/2007 | Sandrew |
| 2002/0116716 | A1 * | 8/2002 | Sideman ........................ 725/91 |
| 2002/0118300 | A1 | 8/2002 | Middleton |
| 2002/0143782 | A1 | 10/2002 | Headings |
| 2002/0144276 | A1 | 10/2002 | Radford |
| 2002/0145622 | A1 * | 10/2002 | Kauffman et al. ............ 345/723 |
| 2002/0194195 | A1 | 12/2002 | Fenton |
| 2003/0158928 | A1 | 8/2003 | Knox |
| 2003/0236886 | A1 | 12/2003 | Oren |
| 2004/0128317 | A1 | 7/2004 | Sull |
| 2004/0264939 | A1 | 12/2004 | Hua |
| 2005/0033758 | A1 | 2/2005 | Baxter |
| 2005/0060422 | A1 | 3/2005 | Rudolph |
| 2005/0091691 | A1 | 4/2005 | Maruya |
| 2005/0144016 | A1 | 6/2005 | Hewitt |
| 2005/0228819 | A1 | 10/2005 | Richards |
| 2005/0268216 | A1 | 12/2005 | Hayes |
| 2005/0268279 | A1 | 12/2005 | Paulsen |
| 2005/0283717 | A1 * | 12/2005 | Giraldo et al. ............ 715/500.1 |
| 2005/0289180 | A1 | 12/2005 | Pabla |
| 2006/0089949 | A1 * | 4/2006 | Robbin et al. ............. 707/104.1 |
| 2006/0123360 | A1 | 6/2006 | Anwar |
| 2006/0129933 | A1 * | 6/2006 | Land et al. .................... 715/723 |
| 2006/0156219 | A1 * | 7/2006 | Haot et al. ................ 715/500.1 |
| 2006/0253783 | A1 * | 11/2006 | Vronay et al. ................ 715/730 |
| 2007/0016657 | A1 | 1/2007 | Ito |
| 2007/0240072 | A1 | 10/2007 | Cunningham |
| 2007/0294664 | A1 * | 12/2007 | Joshi ............................ 717/109 |
| 2008/0016245 | A1 * | 1/2008 | Cunningham et al. ....... 709/246 |

OTHER PUBLICATIONS

Adobe After Effects 6.5 Scripting Guide (2005), Adobe Systems, Inc. (www.adobe.com).

PCT International Search Report and Written Opinion of the International Search Authority, App. No. PCT/US07/69401, Mailed Oct. 10, 2008.

* cited by examiner

METHODS AND APPARATUS FOR REMOTE MOTION GRAPHICS AUTHORING

RELATED APPLICATIONS

This application is related to and claims priority to U.S. Provisional Application No. 60/802,422, filed May 21, 2006, which is incorporated herein by reference.

COMPUTER PROGRAM LISTING APPENDIX

A computer program listing appendix stored on compact disc, submitted herewith in duplicate, is provided. Each disc contains the file 11751484Listing.pdf, size 52, 000 bytes and created on Dec. 21, 2016. The contents of that disc are hereby incorporated by reference in their entirety herein.

BACKGROUND OF THE INVENTION

1. Technical Field of the Invention

Implementations consistent with the principles of the invention generally relate to the field of multimedia presentation generation. More specifically, network-accessible facilities are disclosed that provide post-production digital compositing and motion graphics authoring to users who provide their own core content, which the service supplements via a user-driven interface through the inclusion of modifiable digital still images, artwork, video, sound, and/or other supplemental content selected by the user.

2. Background of Related Art

The art of digital compositing and creating motion graphics is well established and utilized by both amateurs and professionals alike to create visually stimulating motion picture content from otherwise less stimulating motionless visual content. Motion graphics design is a specialty skill, usually handled by artists that concentrate on designing for television broadcast or films.

The growing presence of motion graphics on television, the Internet, and in various forms of entertainment, such as DVDs and video games, is a logical progression from static graphics seen in print and other media, such as billboards and signage. As used herein, motion graphics refers the creation of non-narrative, non-figurative based visuals that change over time. The distinction of non-narrative, non-figurative based visuals separates motion graphics from the larger general definition of animation or film. Although motion graphics often incorporate video, film, animation, photography, illustration, and music, they are not to be confused with ordinary motion of an object such as might occur naturally, unless the footage was integrated with design elements such as type, shapes, or lines. In other words, motions graphics as used herein should generally be distinguished from still graphic images and from slideshow generation technology, and refer to graphics that use video and/or animation technology to create the illusion of motion or a transforming appearance, are usually combined with audio for use in multimedia projects, and are typically displayed via electronic media technology.

The creation of motion graphics typically requires a great deal of skill, drawing from many disciplines, including graphic design, photography, film and video, animation, audio production, and the editing of all of the aforementioned. Even with the software creators who have attempted to simplify the complex tasks associated with the creation of motion graphics content by providing commercially available software products such as Adobe System's Adobe After Effects™, Autodesk™ Combustion,™ and Motion,™ from Apple, Inc., the learning curve for the average consumer can be long, steep, and costly.

Moreover, even if an amateur were to master the use and operation of such commercially available motion graphics software products, there remains another hurdle, namely that pertaining to hardware. As will be appreciated, the average personal computer typically lacks the computing power necessary to handle large number of complex computations needed to render and display motion graphics in real time. To perform the necessary operations associated with the creation of motion graphics, one must utilize a computer with sufficient processing speed, RAM, and specialized graphics capabilities, such as those used by professional practitioners, which are likely beyond the budget of most prospective consumers. Such consumers would typically simply enjoy creating small productions related to personal events and memories, such as weddings, graduations, Christenings, bar mitzvahs, anniversaries, and other notable events in people's lives that that they would like to capture and preserve for subsequent viewing enjoyment.

Among other things, aspects of the present invention address the limitations inherent in current technology by providing an accessible remote service available to users to generate high-quality motion graphics productions that combine a user's own core content with supplemental content made available through the service to produce a polished finished product without the need for the user to possess specialized expertise, hardware, and/or software.

BRIEF SUMMARY OF THE INVENTION

Methods and apparatus are presented concerning network-accessible services that provide post-production digital compositing and motion graphics authoring to users who provide their own core content, which the services supplement via a user-driven interface through the inclusion of digital still images, artwork, video, sound, and/or other supplemental content selected by the user. In one embodiment, following selection and sequencing of the various core and supplemental content components, the services automatically generate and make available to a user a finished product that integrates core and supplemental content. To simplify the compositing task, a series of pre-formatted motion graphics video templates may be made available, covering themes such as corporate announcements, new product offerings, weddings, graduations, Christenings, bar mitzvahs, anniversaries and other notable events and celebrations appealing to consumers, professionals and entities such as businesses, religious institutions, academic institutions and others. The end product provided by aspects of the instant invention may be a professional-quality ensemble motion graphics video production that may be delivered in any popular format, such as AVI, JPEG, MPEG4 and the like to the customer and or to selected recipients via download or common carrier. To maximize user satisfaction while minimizing user learning curve frustration, the user may be directed to select from multiple skill level user interfaces. Such multiple skill level user interfaces may provide varying degrees of user control over content enhancement and automation or scripting.

Other aspects and advantages of the present invention can be seen upon review of the figures, the detailed description, and the claims that follow.

BRIEF DESCRIPTION OF THE DRAWINGS

The accompanying drawings are for the purpose of illustrating and expounding the features involved in the present invention for a more complete understanding, and not meant to be considered as a limitation, wherein.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. It is also to be understood that the terminology used herein is for the purpose of describing particular embodiments only, and is not intended to limit the scope of the invention defined by the appended claims.

Reference will now be made in detail to an implementation of the present invention as illustrated in the accompanying drawings. The same reference numbers will be used throughout the drawings and the following description to refer to the same or like parts.

Unless specifically stated otherwise as apparent from the following discussions, it is appreciated that throughout the present invention, discussions utilizing terms such as "receiving," "determining," "composing," "rendering," "storing," or the like, refer to the actions and processes of a computer system, or similar electronic computing device. The computer system or similar electronic device manipulates and transforms data represented as physical electronic quantities within the computer system's registers and memories into other data similarly represented as physical quantities within the computer system memories or registers or other such information storage, transmission, or display devices.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by general- or special-purpose hardware-based computer systems which perform the specified functions or steps, or combinations of general- or special-purpose hardware and computer instructions.

Aspects of the present invention provide user-friendly methods of creating professional-appearing audiovisual compilations of one or more items of core content and one or more items of supplemental content presented in a video format compatible with performance on a personal computer, television, or other consumer electronic motion video play back device (e.g., DVD players, Personal Media Players, iPods, and the like). Embodiments of the present invention employ a remote computer or computer network, for example, a world wide web-based server, that locally performs all of the necessary computing tasks necessary to create one or more professional-looking motion graphics compilations from preformatted templates. Such systems require no more skill from the user than the ability to direct the uploading of visual and/or audio content and to make, for example, "point and click" on-screen menu selections. In a preferred example of the operation of such a system, the customer begins by creating a user account and logging into an online service via a personal computer (PC), personal digital assistant (PDA), web-enabled cell phone, kiosk, or the like. Once the customer logs into the service, s/he is greeted with an opening page that offers several site navigation choices, such as "open new project", "open current project", "open last project", "open a previous project", "account summary", etc.

As will be appreciated, systems according to aspects of the present invention can be used by the full range of computer users, from everyday consumers seeking to create a memorable tribute to a personal or family event to the corporate consumers looking for an inexpensive and expedient marketing tool to create an instant yet visually exciting promotional compilation to release to the press or prospective clients or consumers.

Before describing specific embodiments of the instant invention in detail, several terms used in the context of the present invention will be defined. In addition to these terms, others are defined elsewhere in the specification, as necessary. Unless otherwise expressly defined herein, terms of art used in this specification will have their art-recognized meanings.

"Content" refers broadly to any audio and/or visual content that can be used in the practice of this invention. Examples of content include still photos, artwork, video (with or without an accompanying audio track), sounds, music, and the like. Content is preferably in digital form. If not in digital form, the particular item(s) of content preferably is(are) converted to a digital media format that is compatible with or the same as the other data format(s) in which the other items of content are presented.

"Core content" means content provided by a user, whereas "supplemental content" refers to content accessed from a source other than the user.

"Remote" refers to a location or device that can be accessed only by traversing another location or device. For example, a "remote" server or computer refers to a computer that a user can access only indirectly, through another computer or other digital appliance. Preferably, a remote computer is one that a user accesses over the Internet or other network through at least one intervening computer.

In computer science and human-computer interaction, a "user interface" in relation to a computer or computer program a computer program refers to the graphical, textual, and auditory information the program presents to the user, and the control sequences, such as keystrokes made on a computer keyboard, movements of a computer mouse, selections from a touchscreen, etc. that a user employs to control the program.

It has been recognized that it would be advantageous to provide a web-based motion graphics service to consumers who wish to create professional looking productions of their cherished memories in the form of digital stills or video footage, i.e., a user's "core content." In particular, aspects of the present invention provide a user friendly web-based or e-commerce-based motion graphics service that allows the compilation and creation of professional productions from pre-scripted theme-specific templates. Such a system maximizes user creativity and satisfaction in an environment that minimizes learning curve-associated frustration and burn-out. The systems according to aspects of the present invention provide multiple skill level-based compilations with tutorials to help a user achieve his/her desired result, relying on the user's creativity, but not requiring specialized knowledge of computer-based systems and tools for creating and editing motion graphics and video productions.

According to aspects of the present invention, the number of special effects that can be offered to users is virtually unlimited. Based on the skill level a user selects, the user will be able to select from completely pre-scripted, "point and click" motion graphics routines at the beginner level to being able to create transitions, fades, fly-aways, spins, blurs, crops, motion tracking, alpha cannel effects, aged film looks, particle generation, dissolves, explosions, light rays, drop shadows, altered perspectives, picture walls with camera angle sweeps, time effects, simulated news flash headlines that spin up to view, and many more. To augment the visual effects, the user is able to select from a large library of sound effects and other audio content.

To address the many possible applications for the services that embodiments of the present invention provides theme-specific templates addressing situations from every day "in the life of" personal events such as birthdays and weddings to business-related situations such as announcements and product launches. Each theme-specific production contains pre-scripted and compiled motion graphics chapters or segments that provide Hollywood-like special effects upon user-provided core content like digital stills and/or video captured from consumer to professional-type cameras, camcorders, cell phones, webcams, surveillance cameras, optical scanners, and any other digital image-generating device. Once a user/customer uploads her/his core content, s/he has the option to add several production options such as backgrounds, backdrops, background music, sound effects, and more from the service and/or its affiliated partners.

Figure 1:
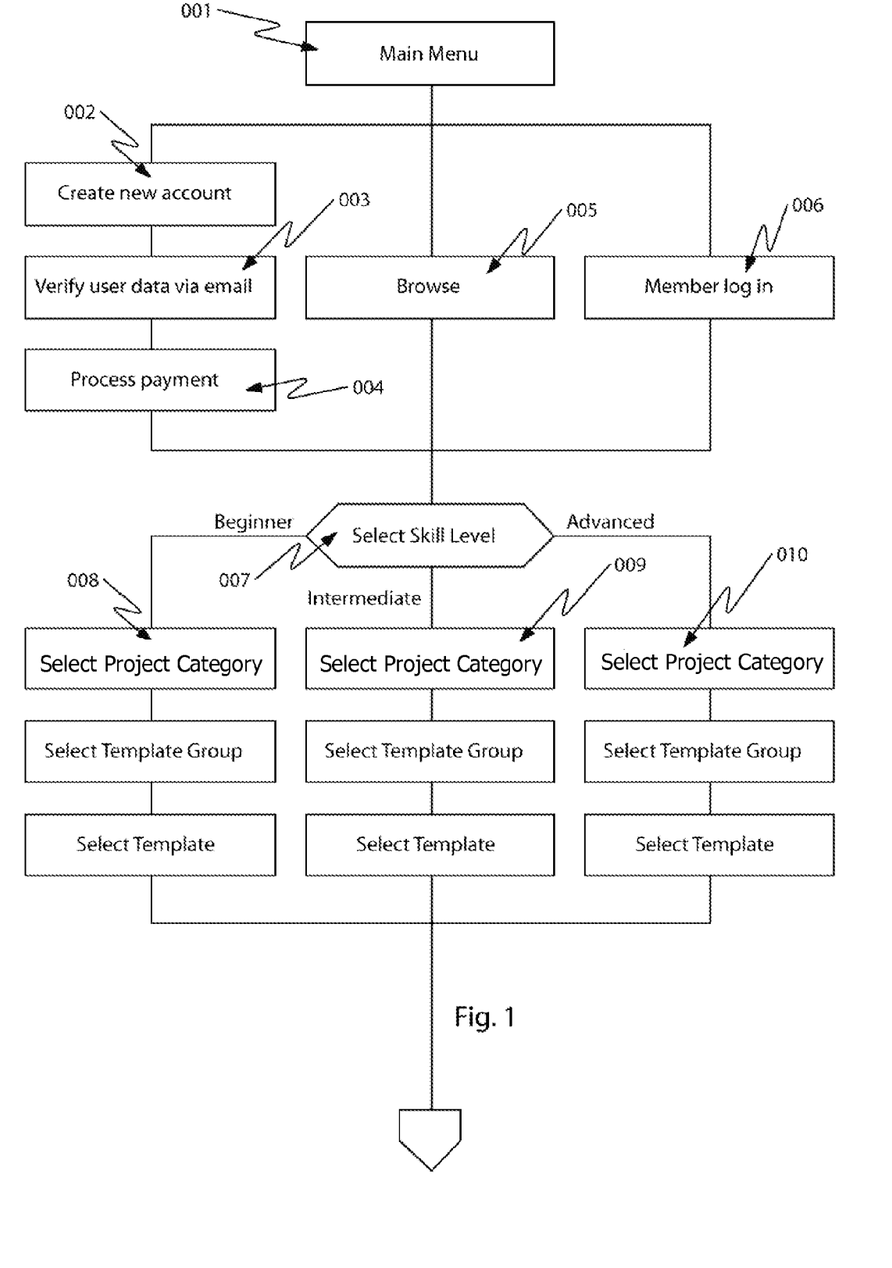
FIG. 1 illustrates an opening menu flow chart for new user and log in processing according to one embodiment of the present invention.

FIG. 1 depicts, in flow diagram fashion, the sequence of operation from an opening menu screen according to one embodiment of the present invention. The visitor to this embodiment's web site is greeted with a conventional opening page or main menu (001). The visitor may then elect to simply browse through the site (005) or join as a new member and create a new account (002). Upon completion of the membership, the user will be contacted via e-mail to have them verify their information (003) by logging into a web site according to embodiments of the present invention. The new member will then be asked to provide credit card or alternative payment methods such as Paypal™, Billpay™, or other similar services.

Upon submitting payment method, a verification process (004) is initiated to verify that a predetermined amount of open credit is available prior to completing the membership process. Existing members may log in (006) and go right to their account. The new members as well as established members are guided to a skill level and tutorial selection screen (007).

Once the user is ready to begin his or her compilation, the user can navigate to the appropriate project category (008). Alternatively, projects may be organized alphabetically, numerically, or in accordance with any suitable scheme, depending on the needs of each particular implementation. The project categories may include such high-level items as "personal," "group," "church," "retail," "corporate," and the like. Template groups (009) within each category (e.g., within the "personal" category) may include such items as Birth Announcements, First day at School, Graduations, Reunions, Family Reunions, Weddings, Anniversaries, First Communion, Confirmation, Bar Mitzvahs, Vacations, and the like. Templates (010) within each template group may include any relevant event. Depending on the requirements of each particular implementation, a user may preview one or more motion graphics templates during the template selection process, as part of pre-membership marketing, or at any suitable point in the user's interface experience. Previewed templates may be displayed as "blank" templates (i.e., with blank portions in place of portions that may be replaced with user content), as sample templates (i.e., with stock or other non-user-provided content in place of portions that may be replaced with user content), or any other suitable format.

Figure 2:
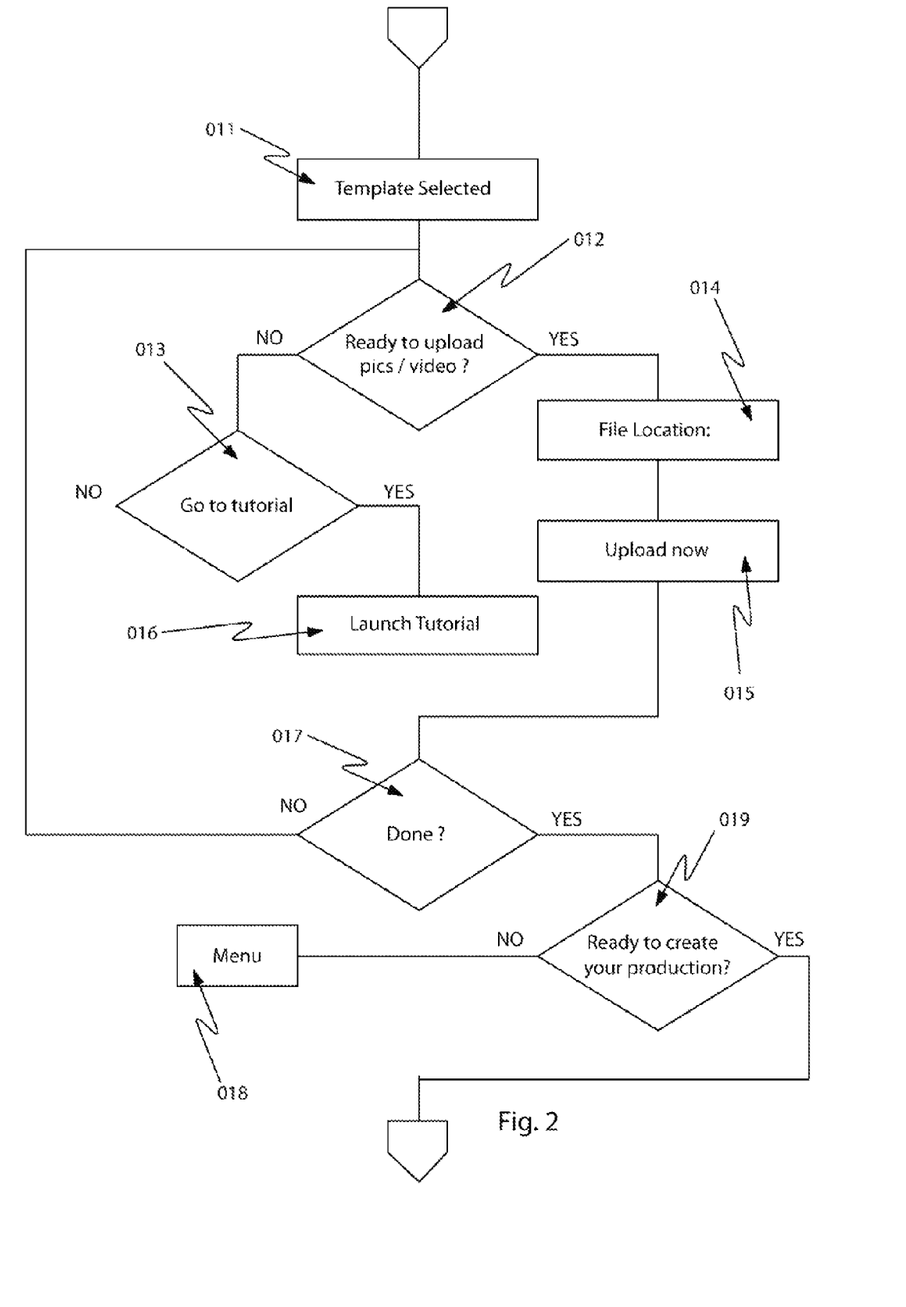
FIG. 2 illustrates a representative post-template-selection flow chart according to one embodiment of the present invention.

Now referring to FIG. 2, which depicts a continuation of the flow chart shown in FIG. 1, once a template is selected (011) the user may elect to either begin uploading content (e.g., images) (012) or go to the tutorial section (013) of the site. It should be understood that a user may suspend the process at any suitable point, log out of the website, and continue the process later, picking up at the point where the user had suspended the process. Returning to the depiction shown in FIG. 2, if the user elects to go to the tutorial section (016) the user may practice at any skill level desired to arrive at a comfort level. If the user elects to upload his or her content, the user will be directed to designate a location (014) on his or her computer or other like device where the files to be uploaded reside. Once the image location is entered, the user will be prompted to upload his or her content (015). Upon completion of loading all the content located at the specified location, the user will be prompted to either indicate that he or she is done uploading (017), or that there are more images to upload from other file locations (012). If the user indicates that uploading is complete, the user will have the choice of either continuing to the "create production" (019) or to return to the main menu (018).

Figure 3:
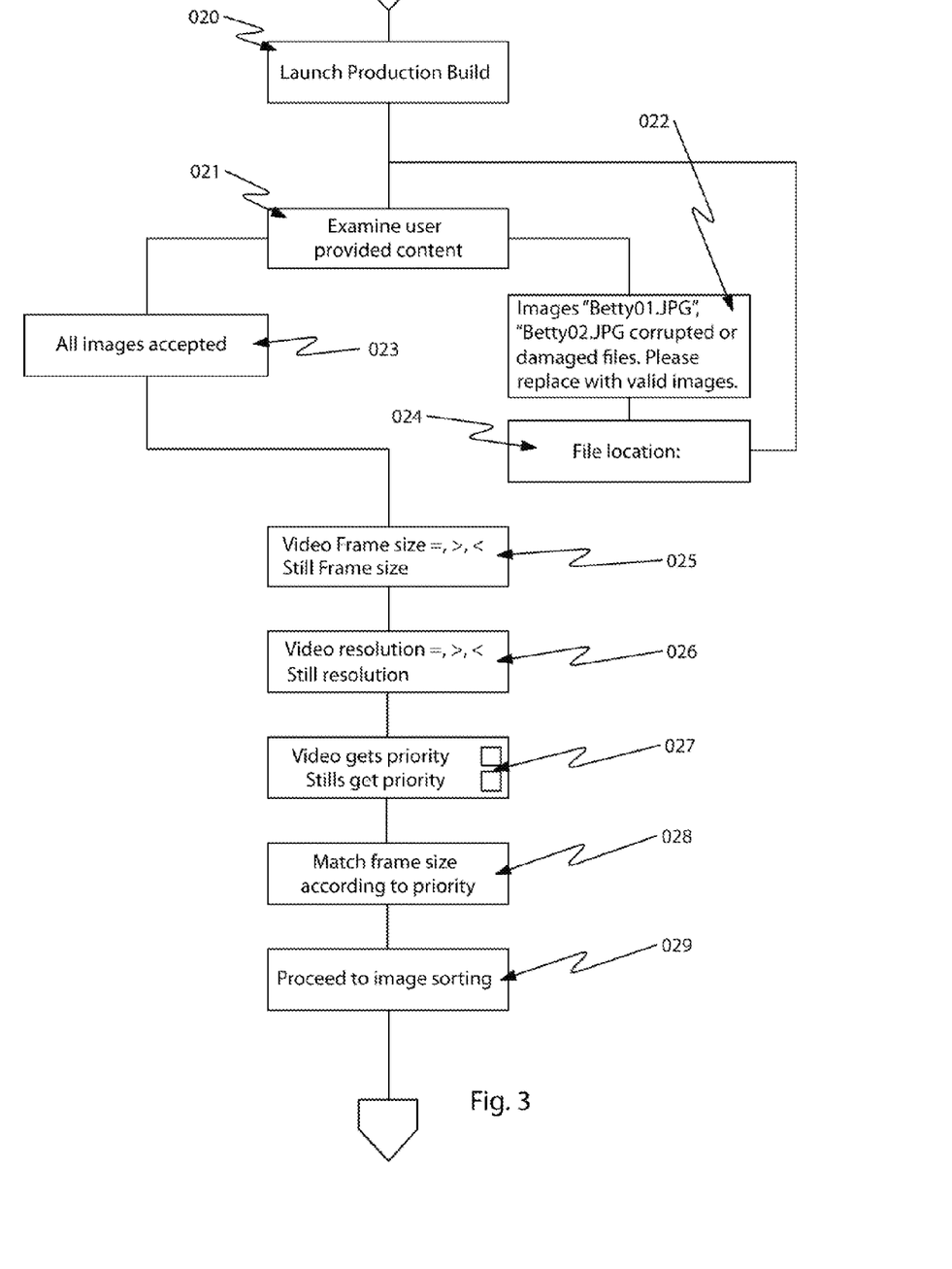
FIG. 3 illustrates a representative video and still frames analysis flow chart according to one embodiment of the present invention.

If the user decides to continue on and go to the "create production," the user may activate the "launch production build" (020) function, as depicted in the continuation flow chart of FIG. 3. Upon selecting this function, the motion graphics server will examine the user's uploaded content looking for flaws in file structure. If the user-uploaded files are acceptable in type and structure, the user may be notified (023) on screen and by e-mail. If any user-uploaded files are corrupted or encoded in unacceptable formats, the server may set a warning flag and alert the user on-screen (022) and/or by e-mail. Once the content is accepted, it is then examined by the server for frame size (025). If the user combined both still images and full-frame size video, such as that from a conventional video camera, the frame sizes from each media type should be relatively close in size. However if one of the two media sources is dramatically smaller in size and/or resolution than the other, the user may be prompted accordingly (025), (026). The user may then be directed to set which media type should get priority (027) and which should be increased in size to match to be in like size of the priority media (028). Upon conclusion of this step, the server may then direct the user to the image sorting screen (029).

Figure 4:
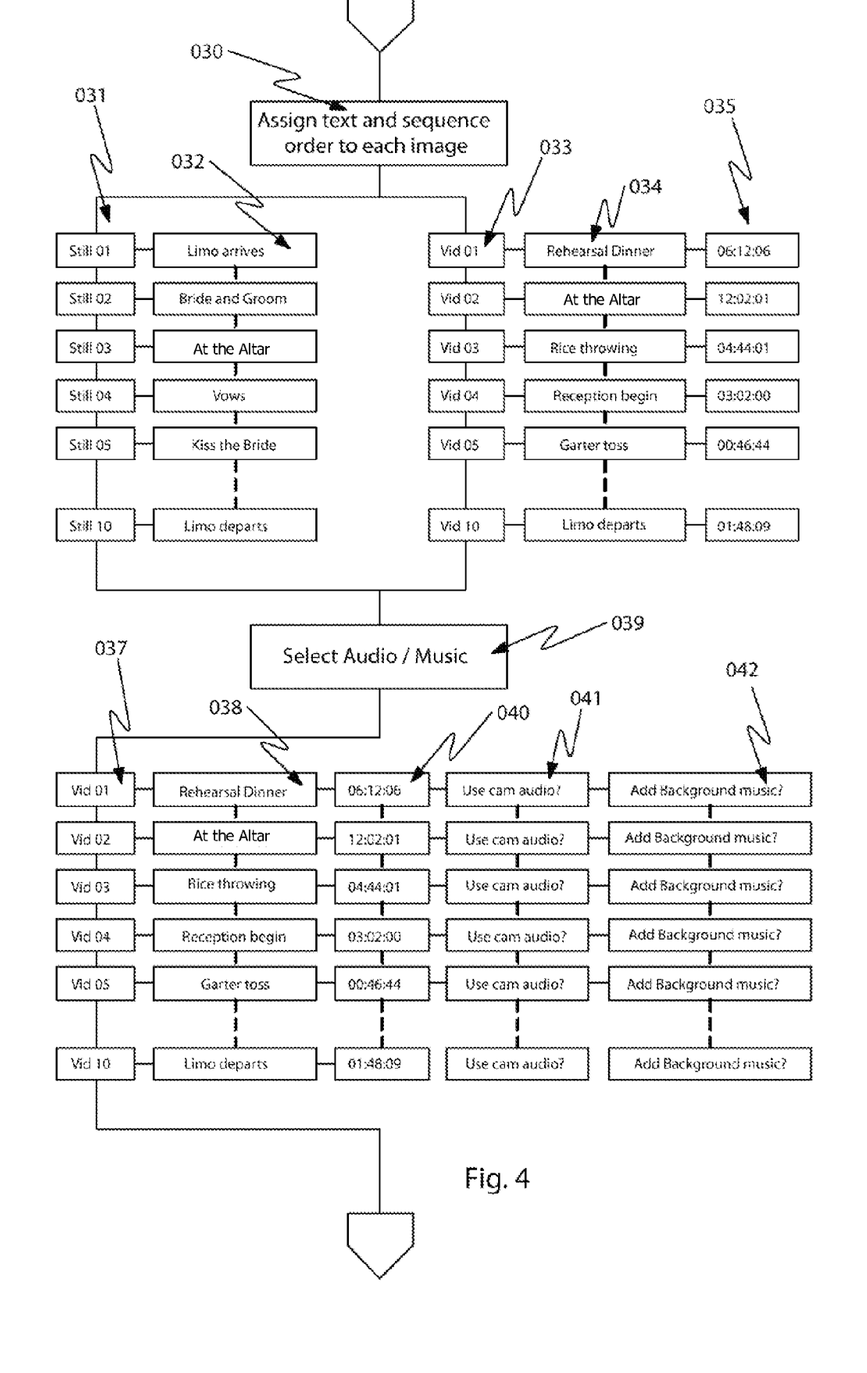
FIG. 4 illustrates the user segment text and sequence assignment flow chart according to one embodiment of the present invention.

Referring now to the continuation flow chart depicted in FIG. 4, at the image sorting screen, the user is directed through a series of image file assignments (030) to prioritize the previously uploaded content. The user may establish priority of still images in a priority cue (031) with existing or newly created or updated filenames (032). Video clips are assigned priority (033), (034) in the same way except there is a segment length time assigned (035) to indicate the length of each segment. As will be explained in more detail later, uploaded content may be modified (e.g., cropped, resized, rotated) according to aspects of the present invention before integration into a template.

Once all clips and stills are prioritized, in one embodiment the user is prompted (039) to determine whether the original media source audio is to be used (041) and/or if the user would like to add background music (042). Upon concluding these steps, now referring to the continuation flowchart depicted in FIG. 5, the user may be directed to select the music (043) from a variety of sources, such as Smart-Sound™ (044) and other royalty free sources (045), as well as "pay per song" services (046) such as Napster™ and iTunes™. As the user selects and purchases music for the ongoing build of the compilation, the user screen illustrates each video segment (047), segment title (048), run time (049) and the music timeline (050, 051, 052). The music timeline is illustrative of the amount of time required to completely fill the segment from start to end with music content. The motion graphics server automatically assigns fade-in and fade-outs as needed at the segment in and out points as well as song to song interplay.

Figure 5:
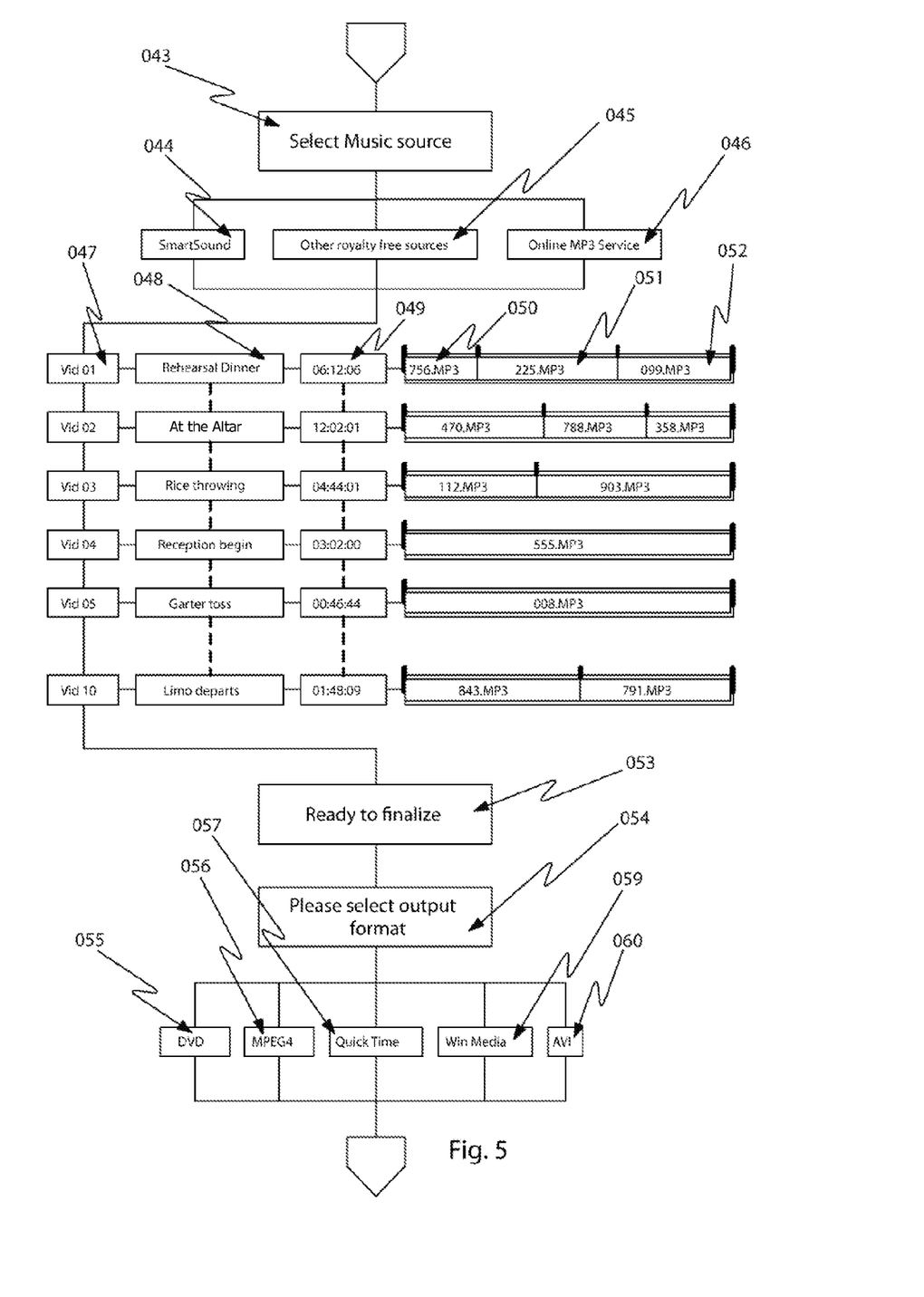
FIG. 5 illustrates a flow chart of the assignment of segment supporting music files according to one embodiment of the present invention.

Upon concluding these steps, the user may be prompted that the production is ready to finalize (053), and the user may be prompted to select one or more output file types, such as DVD (VOB) files (055), MPEG4 files (056), Quicktime™ (057), Microsoft™ Windows™ media files (059), AVI files (060) and any other suitable file type that is playable on one or more media players and media playing PC's and other similar apparatus.

Figure 6:
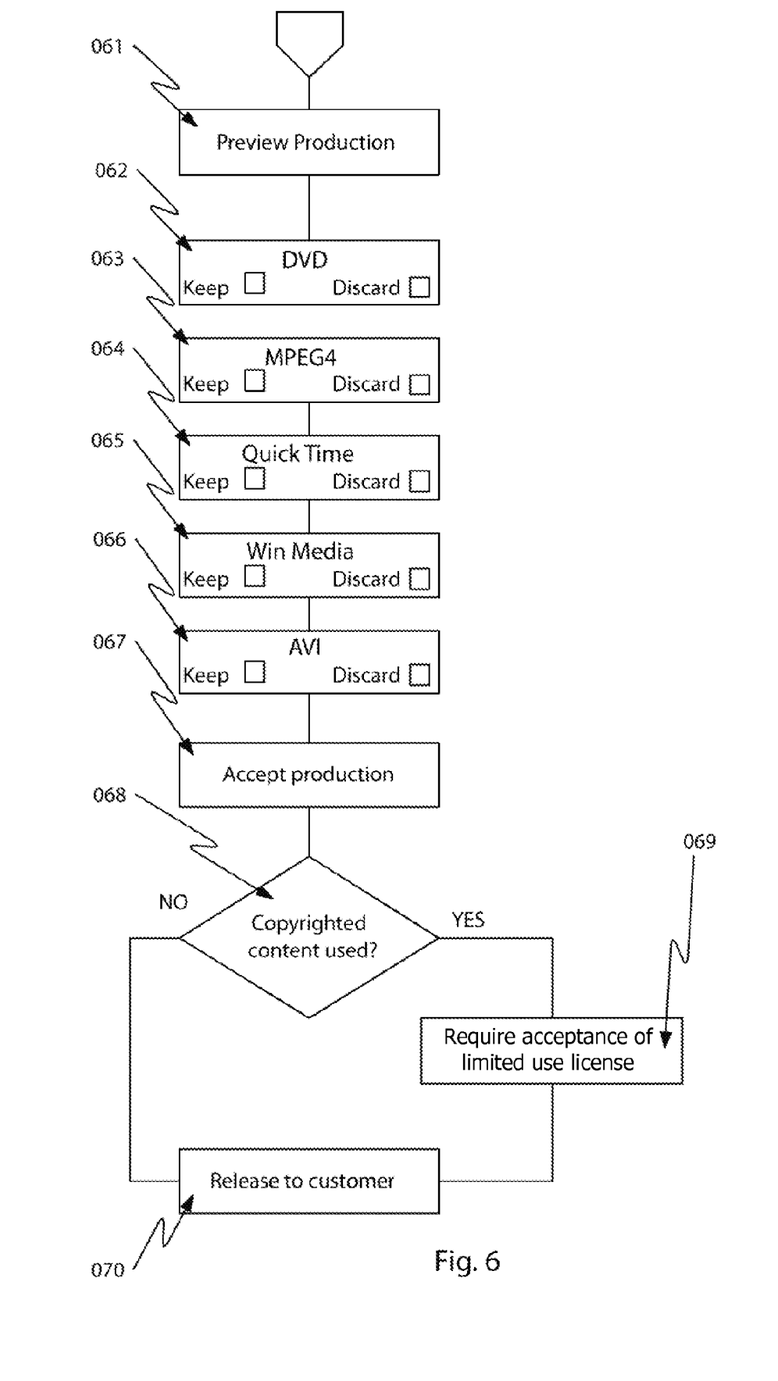
FIG. 6 illustrates a representative diagram showing the various preview formats according to one embodiment of the present invention.

Now referring to the continuation flow chart depicted in FIG. 6, once the motion graphics production is complete in the format of the user's choice, the user may be directed to view the creation (061), and to make any desired corrections or updates. Each of the available file formats may be presented to the user as selected, and then the user may elect to keep or discard any or all of the choices (062, 063, 064, 065 and 066). Allowing the preview of the finished production only after the format is selected according to embodiments of the present invention is due to the fact that the final format type often contributes to the viewing quality of the production, and the user may elect to change his or her original choice to one better suited to his or her intended playback device or those of the persons to whom a user may wish to distribute the production. At this point, the user may accept the production (067). If the user did not use any copyrighted content in the production, the order may be released to the customer (068, 070). If the user elected to use any copyrighted or non-royalty-free materials (068) in the production, such as music, graphics, quotes, or other content subject to applicable copyright laws, the user may be warned not to distribute or publicly show the production. The user may be asked to read and accept the terms of a limited use agreement (069) satisfying the requirements of the licensor of the copyrighted content. The feature of providing copyrighted material(s) to its users according to aspects of the present invention may be subject to the approval and license by the content owners or their agents of record.

Figure 7:
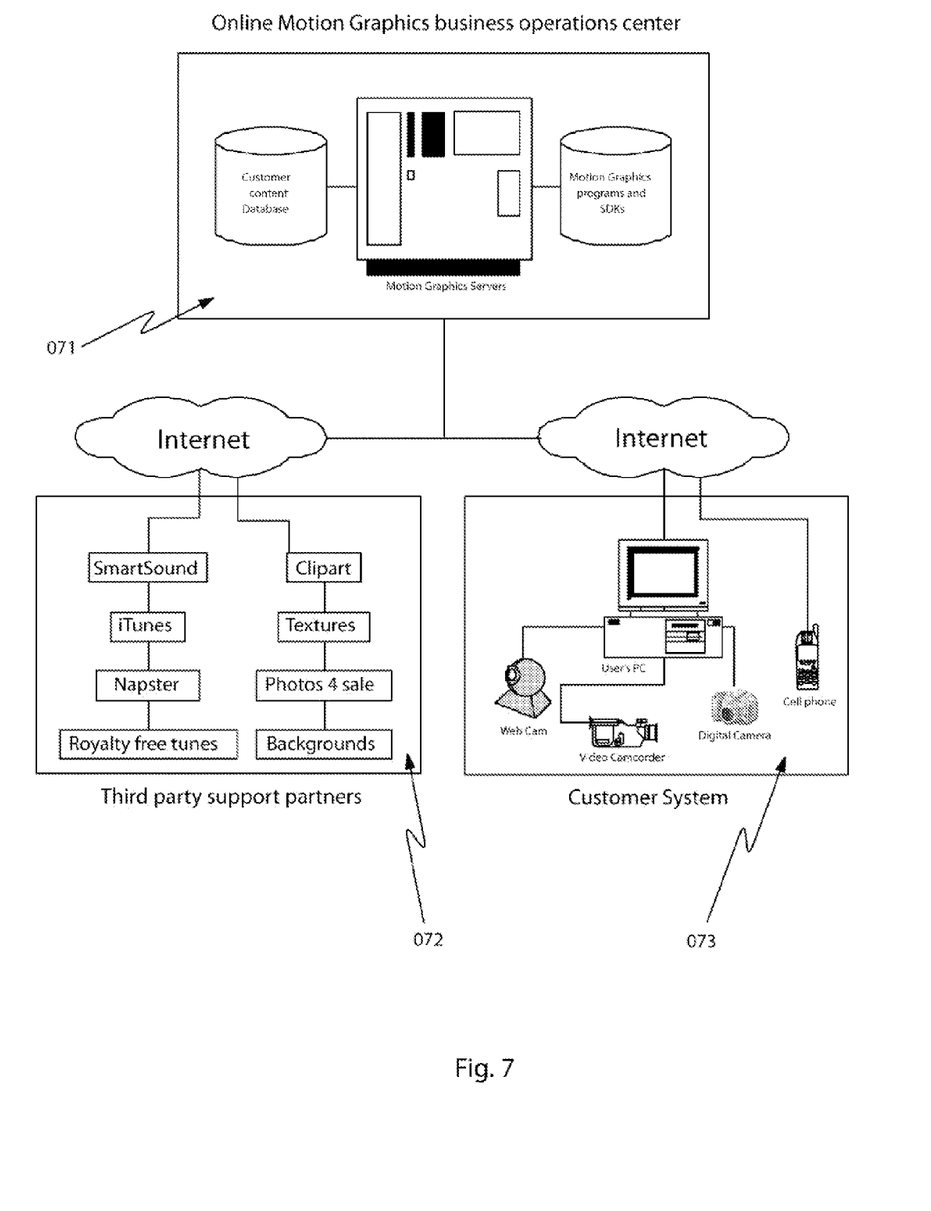
FIG. 7 illustrates a representative diagram of the motion graphics operations center servers in relation to the Internet and its content-providing partners and its customers according to one embodiment of the present invention.

FIG. 7 illustrates a representative diagram of the motion graphics operations center servers (071) in relation to the Internet and its content-providing partners (072) and its customers (083) according to one embodiment of the present invention. As depicted in FIG. 7, an online motion graphics business operations center (071) comprises one or more motion graphics servers (described more fully later), which communicate with motion graphics programs and software development kits (SDKs), as well as with customer content databases. The online motion graphics business operations center (071) also communicates via the Internet or other suitable communication network to customer systems (073) and third-party support partners (072).

As shown in FIG. 7, customer systems (073) may include a personal computer connected to the Internet or other suitable communication network. According to embodiments of the present invention, customer personal computers provide a user interface for the customer for executing some or all of the steps that have been described earlier and depicted in FIGS. 1-6. Such a user interface may comprise web browser components (e.g., Microsoft™ Internet Explorer™), as well as a client runtime presentation application (e.g., Adobe™ Flash Player™), as will be described in more detail later. A customer personal computer may communicate with digital cameras, video camcorders, web cameras, and any other suitable interface or device for transferring and/or incorporating user content into systems according to aspects of the present invention. Content may of course also be transferred and/or incorporated via any suitable storage medium, such as flash memory storage devices, hard drives, CD-ROM or DVD drives, network-accessible content storage facilities (whether local or remote), and the like. Also, alternatively, among the other forms that a customer personal computer according to aspects of the present invention may take is a web-enabled cell phone, as shown in FIG. 7.

Content to be integrated into presentations in accordance with aspects of the present invention may also originate from, be stored in, and/or be transmitted from a variety of third-party support partners (072) via the Internet or other suitable communication network, as shown in FIG. 7. In this way, a user may augment the variety of content (whether still or video images, sound, or other content format) available for integration into a presentation beyond the content that may be locally available at a customer system (073). Also, content may be stored and/or transferred manually and/or automatically from any suitable network-accessible commercial facility, such as Photobucket™ (accessible at www.photobucket.com), Snapfish™ (accessible at www.snapfish.com), and the like.

Figure 8:
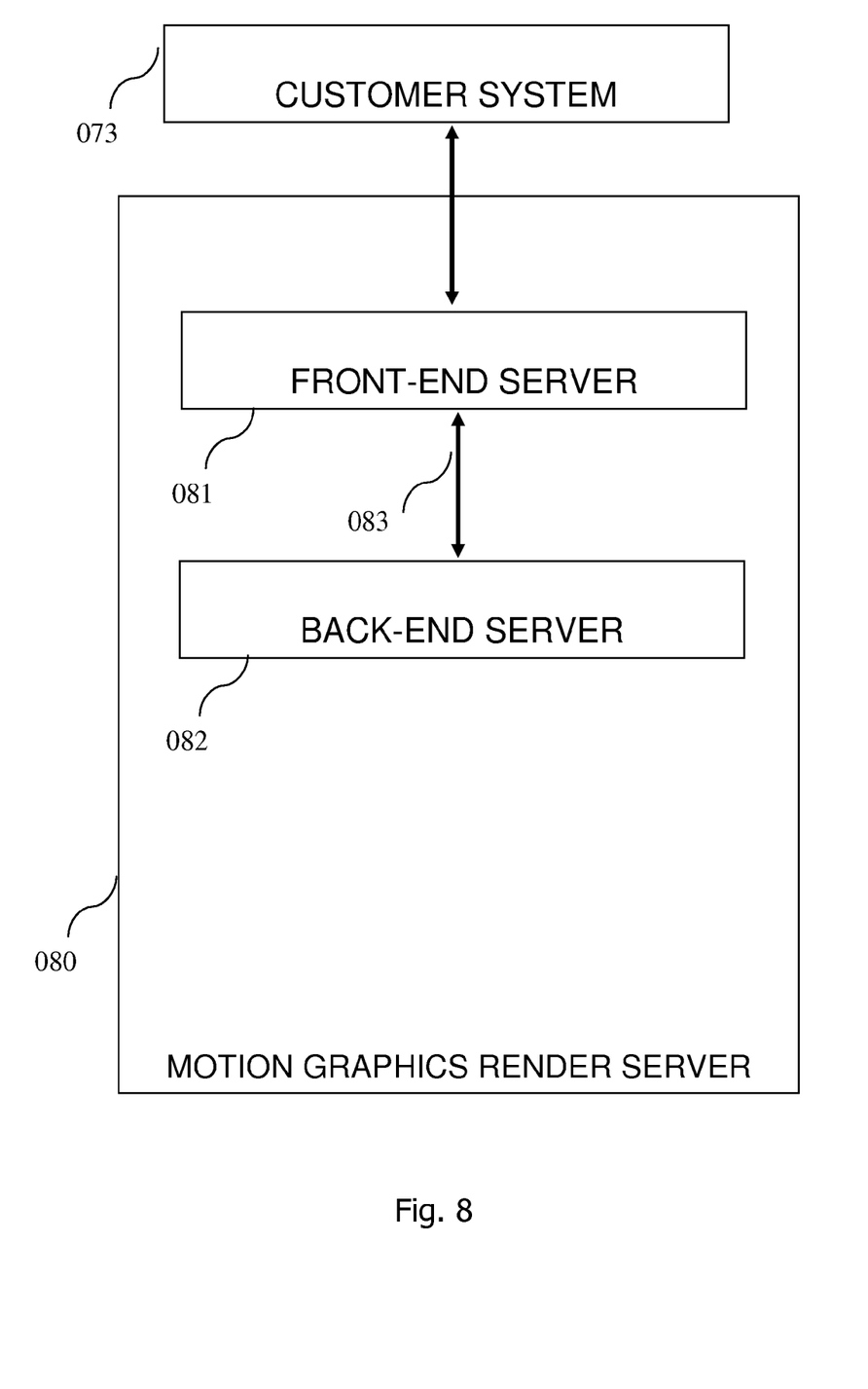
FIG. 8 illustrates a representative diagram of render server architecture according to one embodiment of the present invention.

As shown in FIG. 8, in one embodiment, a motion graphics render server (080) comprises two sets of servers: a front end (081) and a back end (082). The front end (081) comprises a web-based user interface (UI) presented to the end user while the user is creating multimedia presentations according to aspects of the present invention. As described earlier, the front end server (081) may communicate with a customer system (073) and present and manage a user interface via the Internet or other suitable communication network. This front end component (081) facilitates all aspects of creating such presentations, such as editing, deleting, and modifying them. This front end component (081) may also be responsible for keeping track of all of the projects of a particular user. This front end component (081) may comprise its own database, and this database may be used to keep track of a user's content-based assets and projects as well as all of the templates for presentation creation. In one embodiment, the front end server (081) may be implemented as a farm of multiple physical computers.

As shown in FIG. 8, the back end server (082) communicates with the front end server (081) via bidirectional communication interface (083), which may be a high-bandwidth local area network or other suitable interface, depending on the needs of each particular implementation. In one embodiment, the back end server (082) may be implemented as a server farm comprising one or more physical computers. According to aspects of the present invention, finished personalized multimedia presentations are rendered within the back end server (082), and preview images and videos are generated within the back end server (082) as well. As discussed earlier with reference to FIG. 7, the front end server (081) and/or back end server (082) may communicate with third-party support partners (072) via the Internet or other suitable communication networks, as well as with local or remote customer content databases. Additional details concerning the front end (081) and back end (082) functionality according to aspects of the present invention are set forth throughout this document.

Figure 9:
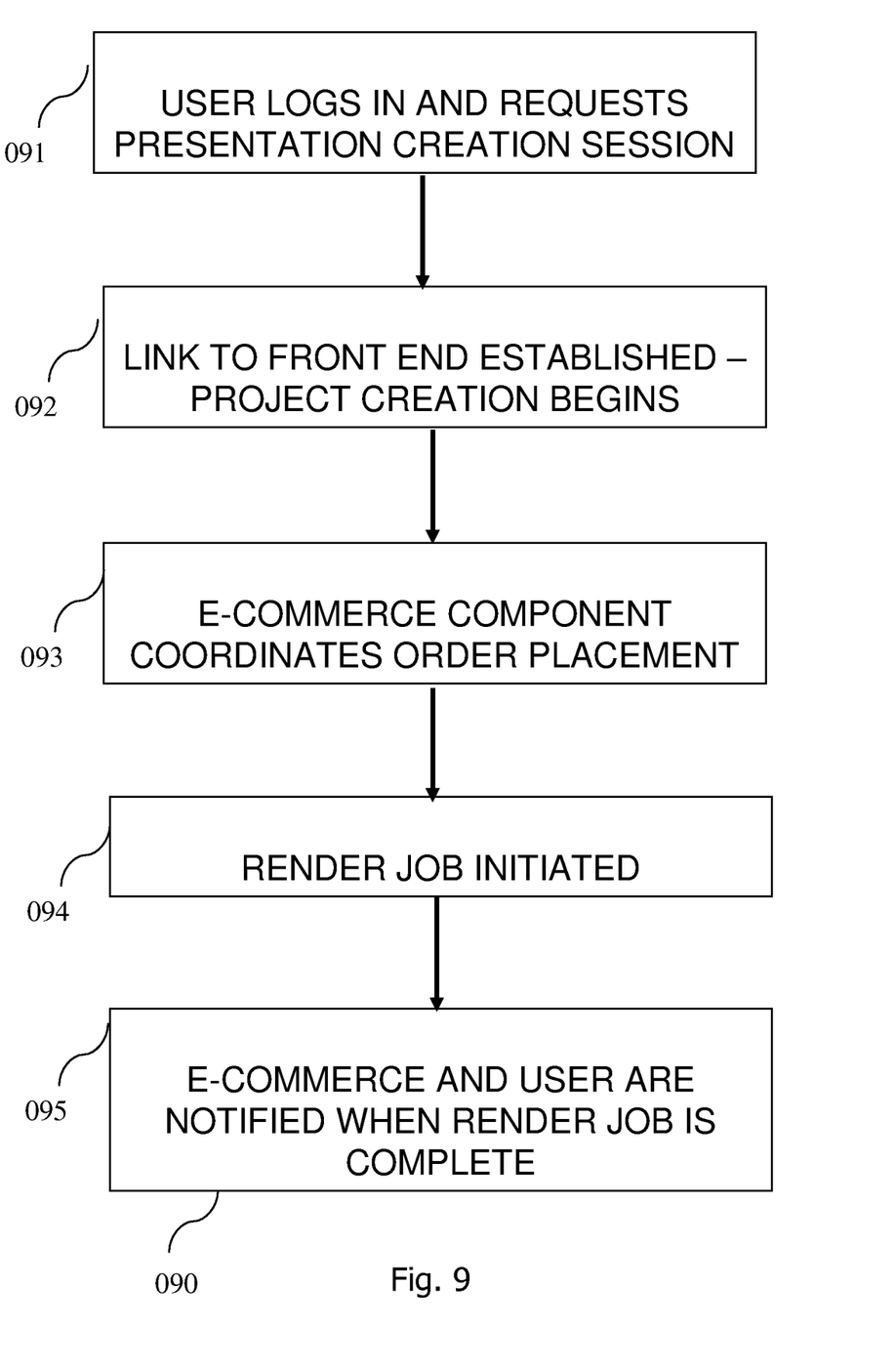
FIG. 9 illustrates a representative sequence diagram showing high-level actors and interactions according to one embodiment of the present invention.

FIG. 9 depicts a sequence diagram (090) showing high-level actors and interactions according to one embodiment, and depicts an exemplary chronological order of communications from top to bottom. As shown in FIG. 9 (in view of the earlier figures and discussion), a user logs in through an account maintenance facility at step (091) and requests a presentation creation session. The appropriate authentication of the user then occurs, and at step (092) the user is presented with a link into the front end to create and edit projects. In one embodiment, the communication mechanisms to create and edit projects is iterative. The user makes changes to and otherwise works on a project via the front end server (081) user interface. The front end (081) coordinates requests for asset name lists, assets, and/or thumbnails of assets as necessary as a project progresses via web service components from a content server component. Also, preview images and/or preview video clips may be requested and received in real time from the back end (082) (not shown in FIG. 9).

The user continues to work on his/her project until he or she is ready to make an order. At this point (093), a link presented by the front end directs the user to an e-commerce component. The e-commerce component requests from the front end the identity of jobs available to be rendered and sold/transferred to the user. Once the user makes a purchase or otherwise requests a presentation, the e-commerce component calls in to the front end to request or start a render job (094). The back end pair completes the render operation and notifies the e-commerce component (095) when it is finished. The e-commerce component may then notify the user (e.g., by sending the user an e-mail message).

In one embodiment, the front-end server (081) operates in a LINUX operating system environment, employs an application framework using the commercially available "Ruby on Rails" software system, and comprises a structured query language ("SQL") server. The server artchitecture is scalable, such that multiple front-end servers and/or back-end servers may be included in particular implementations. In one embodiment, the back-end server (082) also comprises a SQL database and server, and executes motion graphics compositing programs as coordinated by a render controller, as described in more detail throughtout this document.

Presentation templates according to aspects of the present invention may be stored in each render server (082), along with default music. In one embodiment, each asset (e.g., image, sound, video) within a template has a unique name, and a naming convention is established for assets in the template to identify which assets are changeable by the user. A script according to aspects of the present invention traverses or "crawls" through the data structures that define the chosen template, searching for replaceable assets and replacing them with user-selected content. Each replaceable asset may be identified based on its name and/or location within a template, as well as by the timecode within the presentation at which it first appears.

According to aspects of the present invention, as discussed earlier, a render controller is a program that executes on each back-end render server and accepts responsibility for that render machine of render jobs to be done. It is also responsible for appropriately storing and naming rendered output for subsequent use by the back end servers. Each render controller may also signal the end user indirectly (via accessing a web service on the back end that sends an e-mail message to the user) when a final product render has bee completed.

Communication from the back-end render engine to each render controller is via an SQL (structured query language) table in accordance with one implementation. The render engine populates the SQL table with orders for a rendering job. There are various types of render jobs that may be ordered, depending on the requirements of each particular implementation. Each render controller program instance (one on each render machine) atomically queries the database for the oldest unaccepted order, and if there is one marks it as accepted in one atomic step, thus eliminating a potential problem where one back-end render server requests something to do (e.g., replace a particular image within a specific template with identified user-uploaded content) and another back-end render server also requests something to do and they both get assigned the same task.

Once a render controller is assigned a task, it retrieves all of the required information from the appropriate SQL database, generates the script that specifies the content replacements, and initiates the command-line script (e.g., aerender, as mentioned earlier) that controls the motion graphics and compositing software, executes the appropriate scripts to crawl through database structures, effect the required asset replacement operations, then initiate a rendering operation. Each selected render controller thus builds various batch and script files (e.g., Javascript files) to control the render job, and then initiates an instance of any suitable digital motion graphics and compositing software program (such as Adobe System's Aerender™, which is a commercially available command-line version of the Adobe After Effects™ software). The schema for the table that is used in one embodiment for these aspects of system communication is as follows:

```
CREATE TABLE 'orders' (
    'id' int(11) NOT NULL auto_increment,
    'job_id' int(11) NOT NULL default '0',
    'item' varchar(64) NOT NULL default '',
    'status' varchar(64) NOT NULL default '',
    'output' varchar(128) NOT NULL,
    'link' varchar(64) NOT NULL default '',
    'started' timestamp NOT NULL default CURRENT_TIMESTAMP on update CURRENT_TIMESTAMP,
    'est_render_time' int(11) NOT NULL,
    PRIMARY KEY ('id')
) ENGINE=MyISAM DEFAULT CHARSET=latin1;
```

In the above exemplary schema, the 'id' field is the unique identifier in the database for this record. The 'job_id' field is the identifier of the job to which this order is attached or which it references. The 'item' field describes the type of render order. Possible exemplary values for the 'item' field and a brief description of how the render controller interprets each are as follows:

1) preview frame ### (where ### is the frame number to preview): These are the preview renders used when an end user uploads new assets to replace existing assets for a job.

2) preview vid: This is a preview rendering (such as in a Flash™ Player Video format) used on the preview page of the web user interface.

3) tasset preview ### (where ### is the frame number to preview): This is a preview generated during the template import process. This is an internal type of render done once for each replaceable asset for a new template. It is similar to the preview frame render item, except no assets will be replaced, and the size and image quality are set to serve as 'empty' previews for the template in the engine.

4) web render: This is the format for final output presentation rendering.

5) LoRes render: This is a lower-resolution rendering output format.

Referring back to the exemplary schema for the table that is used in one embodiment to communicate by a render controller with other system components according to aspects of the present invention, the 'status' field indicates the current status for each order. The 'output' field indicates the file name that should be assigned to whatever output is generated from the render order. The 'link' field is the universal resource locator ("URL") of the final rendering (if applicable). The 'started' field is a timestamp for the beginning of the render process. The 'est_render_time' is a field used to help an order determine the depth of the render queue in front of it. This field may be used to report to the end user an approximate time to completion of a render order.

In one embodiment, Extensible Markup Language ("XML") is the format of messages sent between various pages in the user interface (UI) and the back end render server engine. Communications occur according to aspects of the present invention as web services are published by the engine and consumed by the Flash™ pages on the end user's machines. There are a number of exemplary web services that may be published by the render server engine. For example, a "music_service" is associated with the "editmusic.rhtml" URL in one embodiment, and the render responds with an array of available song names. As another example, a "music_choose_service" is also associated with the "editmusic.rhtml" URL in one embodiment. For this service, a Flash™ server sends the job identifier and the name of the selected song, and the render server responds with the status, either "success" or "failure."

As another example, a "preview_service" is associated with the "preview.rhtml" URL in one embodiment. For this service, a Flash™ server sends the job identifier, and the render server responds with three items. First, the render server responds with a 'status' field, which may contain one the followings codes: 'started rendering,' 'in progress,' or 'finished.' The render server also responds with 'timeleft' field, which provides the estimated amount of time remaining to finish rendering of a preview job. Finally, the render server responds with a 'filename' field, which provides the name of the rendered preview file.

As another example, a "img_service" is associated with the "upload_flash.rhtml" URL in one embodiment. For this service, a Flash™ server sends the job identifier, and the render server responds with XML code comprising all asset records, where the job identifier matches the job identifier sent from the Flash™ server, and all Tasset records (set forth in more detail below), where the template identifier matches the template for the job referenced by the job identifier.

As another example, a "img_service_mods" is also associated with the "upload_flash.rhtml" URL in one embodiment. For this service, a Flash™ server sends an XML-based description of the current state, including changes made in the Flash™ page for user image assets in the current project. Fields communicated comprise 'id', 'name', 'tasset_id', 'scale', 'rotation', 'xcenter', 'ycenter', and 'delete'. The following code provides an exemplary instance of this service:

```
<root>
    <assetmod>
        <id>1221</id>
        <name>spongebob6.jpg</name>
        <tasset_id>-1</tasset_id>
        <scale>1</scale>
        <rotation>0</rotation>
        <xcenter>520</xcenter>
        <ycenter>230</ycenter>
        <delete>false</delete>
    </assetmod>
    <assetmod>
        <id>926</id>
        <name>class.jpg</name>
        <tasset_id>401</tasset_id>
        <scale>0.233679802293651</scale>
        <rotation>0.189422585700089</rotation>
        <xcenter>589</xcenter>
        <ycenter>300</ycenter>
        <delete>false</delete>
    </assetmod>
    <assetmod>
        <id>924</id>
        <name>dylan.jpg</name>
        <tasset_id>405</tasset_id>
        <scale>0.288804</scale>
        <rotation>0.00554011</rotation>
```

-continued

```
        <xcenter>425</xcenter>
        <ycenter>254</ycenter>
        <delete>false</delete>
    </assetmod>
    <assetmod>
        <id>887</id>
        <name>1176_thumb.jpg</name>
        <tasset_id>409</tasset_id>
        <scale>0.91529</scale>
        <rotation>-0.0468407</rotation>
        <xcenter>420</xcenter>
        <ycenter>223</ycenter>
        <delete>false</delete>
    </assetmod>
    <assetmod>
        <id>885</id>
        <name>spongebob-image-03.jpg</name>
        <tasset_id>387</tasset_id>
        <scale>0.558207</scale>
        <rotation>0.00344101</rotation>
        <xcenter>502</xcenter>
        <ycenter>221</ycenter>
        <delete>false</delete>
    </assetmod>
    <assetmod>
        <id>883</id>
        <name>Img02.jpg</name>
        <tasset_id>410</tasset_id>
        <scale>0.469082205995374</scale>
        <rotation>0.113772236287929</rotation>
        <xcenter>517</xcenter>
        <ycenter>235</ycenter>
        <delete>false</delete>
    </assetmod>
    <assetmod>
        <id>881</id>
        <name>monkey.jpg</name>
        <tasset_id>407</tasset_id>
        <scale>0.210859</scale>
        <rotation>0.0291888</rotation>
        <xcenter>448</xcenter>
        <ycenter>232</ycenter>
        <delete>false</delete>
    </assetmod>
    <assetmod>
        <id>882</id>
        <name>img.jpg</name>
        <tasset_id>396</tasset_id>
        <scale>0.493419815931726</scale>
        <rotation>-0.0906598872007449</rotation>
        <xcenter>439</xcenter>
        <ycenter>231</ycenter>
        <delete>false</delete>
    </assetmod>
    <assetmod>
        <id>884</id>
        <name>alex.jpg</name>
        <tasset_id>391</tasset_id>
        <scale>1.56783</scale>
        <rotation>0.0690357</rotation>
        <xcenter>490</xcenter>
        <ycenter>310</ycenter>
        <delete>false</delete>
    </assetmod></root>
```

For this exemplary "img_service_mods" service, the render engine responds in one embodiment with an XML response comprising the following fields: 'number_of_records', 'response', and 'output,' where 'response' is encoded as 'changes accepted,' and 'output,' may include debug or textual information regarding the status of the modifications to be displayed in the Flash™ animation.

In one embodiment, there are three specific types of render orders that are processed by the machines in the render farm:

1. Preview Still Renders: These are still images rendered from specific timestamps within a user's project. They are intended to give the user a preview of what the user's assets or text modifications will look like in each individual motion graphics video frame in the finished piece.

2. Preview Video: This is a Flash™ version of the piece given all assets currently uploaded or modified in a user's project. This facility provides the user with an overall preview of the project's progress.

3. Final Render: There are several output formats available for the final output. The final product is generally the culmination of the effort by the user of building the piece. This is the deliverable.

According to aspects of the present invention, a render order is a function of logic in pages of the user interface that determines that the user has made a modification to the project, or ordered a final output and that a new rendering needs to take place. Under such circumstances, an order record may be generated in the system's database. In one embodiment, there is one instance of the render controller program running on each render server in a render server farm. Each render controller atomically queries the database for any 'unclaimed' orders outstanding, and if it finds any will mark it as 'taken'. As discussed earlier, this is an atomic set of queries so there is no possibility that any two render controller instances will be assigned the same order. Once a render controller instance has taken ownership of an order, that render controller instance takes the appropriate actions to render the requested order, as described throughout this document.

According to aspects of the present invention, creating a job is a multi-step process. In one embodiment, the steps are designated in the user interface as tabs along the top of the user interface screens. The user may move from any step to any other step, and the steps do not have to be performed consecutively, with the exception that in one embodiment once a template is chosen, the user may not re-choose a template. This limitation is due to the fact that assets chosen for a given template may not make sense in another template (e.g., baby pictures do not belong in a travel piece, and even baby pictures chosen for one baby piece may not look right in another).

In one embodiment, the job creation steps are executed with a particular job as 'current,' and actions taken on a given job creation screen (for example image upload) affect the current job. The user may be directed to any of the job creation user interface screens from a number of interfaces. For example, the starting point may be a "create a new video form," in which case the currently affected job is the newly created one. Alternatively, the starting point may be a "edit link from the job list," in which case the currently affected job is the one designated on the line of the job list that the edit link was from. As a final example, the starting point may be a screen interface associated with "another job creation or step," in which case the currently affected job is the same one as was affected by the screen that the user came from.

In one embodiment, the first step in creating a video job is to choose a theme. As discussed earlier, themes may be groups of templates organized by content or other indexing mechanism. Once the user has chosen a theme, the user is directed to choose a template screen. A template may be is a collection of assets (e.g., images, movies, sound) that can be rendered by the system into a multimedia presentation. The template also contains information about what assets within that template may be replaced by the user. The template thus provides the look and feel and overall structure of the final video piece presentation.

The second step to creating a video job in one embodiment is to choose a template. The user may be presented with a representative screen shot of each available template, a name for the template, the duration of the template, and the number of replaceable content items (e.g., images) in the template. As mentioned earlier, depending on the requirements of each particular implementation, a user may preview one or more motion graphics templates during the template selection process or at any suitable point in the user's interface experience. Once a template is chosen, the user may be directed to a facility (e.g., a web page) for uploading content. This facility is the heart of the job creation process in one embodiment.

The image upload process comprises three user interface screens in one embodiment: an "uploaded images" screen, an "upload your images" screen, and a "place and edit your images" screen. The "upload your images" screen is used to upload both static image assets and movie assets. When movie assets are uploaded, they are looped while displayed on the "uploaded images" screen and the "place and edit your images" screen. According to aspects of the present invention, the "place and edit your images" screen is interactive with drag-and-drop elements and image modification controls. Context-sensitive online help may be available to the user as well.

In one embodiment, on the "uploaded images" screen, the user may roll over his or her content (e.g., images) and obtain an overview of what the images look like in the preview window. Users may can also view and select images for modification. If the user has not uploaded any images (e.g., if it is the user's first time uploading images), the user interface may proceed to the "upload your images" screen when the user activates on one of the boxes/images, otherwise may proceed to the "place and edit your images" screen.

The "upload your images" screen in one embodiment is the first screen the user sees after clicking on an empty image from the previous screen. The "place and edit your images" screen according to aspects of the present invention is the page where modifying (e.g., editing/re-sizing/rotating) of images occurs. After the user has uploaded his or her images, the thumbnails may appear on the screen. If a user wishes to upload more images, the user may simply activate the "upload new images" control and select the image files to upload. From here, the user may select/add the image by either clicking on the thumbnail version of the image or dragging it into a frame on the screen. To re-size/rotate the image in one embodiment, the user may move the mouse over specific areas (e.g., white boxes) on the image, at which point the mouse cursor will change into an arrow icon for resizing, and by clicking and dragging portions of the image in a manner familiar to skilled artisans, the image may be re-sized/rotated. When a user modifies an image or other asset according to aspects of the present invention, the modified image is generated by the front-end or back-end server, and may be transmitted to the user's client computer system via the Internet or other suitable communication network. Alternatively, a modified asset such as an image may be generated at the user's client computer system without server involvement (e.g., by implementing image modification using facilities such as Flash™).

In one example, image manipulation facilities may be implemented as one or more Flash™ objects. These objects are self-contained programs that may be written in the ActionScript™ programming language, for example. Flash™ objects may be stored on a server-side database and retrieved when a web page containing reference to the object is downloaded by the browser. In particular, Flash™ objects may be embedded into a web page by providing a reference in a HTML object or embed tag, or the like. Once the Flash™ object is downloaded, the Internet browser displays it using a commercially available Flash Player™.

Depending on the needs of each particular implementation, asset uploading and/or modification may be effected in various ways. In one embodiment, a user may upload one or more assets (e.g., images) via a Flash™ interface to a server, which stores the assets. The assets are then downloaded back into the Flash™ application running on the user's machine. There, the user may modify the asset, such as by providing the following exemplary functionality in the case of a still image: scaling, aspect ratio adjustment, translation within the boundaries of the original image, rotation, brightness, contrast, gamma correction, hue rotation, saturation, luminance, blurring, sharpening, edge detection, and other image modification techniques known in the art.

In another embodiment, the user may uploads one or more assets via a Flash™ interface to a server, and then the assets are downloaded back into the Flash™ application running on the user's machine. There, the user may issue instructions to the application running on the server regarding modifications to the assets. For example, in the case of a still image, the user may modify the asset, such as by providing the following exemplary functionality: scaling, aspect ratio adjustment, translation within the boundaries of the original image, rotation, brightness, contrast, gamma correction, hue rotation, saturation, luminance, blurring, sharpening, edge detection, and other image modification techniques known in the art. Once the asset modification instructions have been recorded in the client computer, the instructions are transmitted to the server machine across the Internet or other suitable communication network, where the assets, the instructions, and potentially a template are transmitted to a back-end server for further processing, as has been described herein, to create a motion graphics multimedia presentation.

In another embodiment, the user may upload one or more assets (e.g, images) via a Flash™ interface to a server, and then the images are downloaded back into the Flash™ application running on the user's machine. There, the user may issue instructions to the application regarding modifications to the assets. The user may then modify the image as described above. Once the instructions have been recorded in the client computer, the instructions are transmitted to the server machine as described earlier, where the images are modified per the instructions for image modification. Finally, the modified images and potentially a template are transmitted to a back-end server for further processing, as has been described herein, to create a motion graphics multimedia presentation.

In certain embodiments, templates may display text as part of a presentation. The user is able to define such text using any suitable facility (e.g., a web page for choose text). When the user makes a text field current (e.g., by putting a cursor on a text field and clicking with a mouse, or by tabbing from another field), an appropriate preview may be displayed. Over each text field may be displayed the text as currently defined for that field for the job. If more lines of text are available, the lines of text section of the selection screen may scroll to show all available editable text.

In certain embodiments, the user is offered the option of uploading his or her own sounds or music, or of choosing from a collection offered by the system, as described earlier. If the selected soundtrack is longer than the video presentation, it may be faded out at the end of the video presentation. If the video presentation is longer than the soundtrack, then the soundtrack may be repeated until the end of the video.

According to aspects of the present invention, at any point in the job creation process, the user may visit the preview screen. This screen may display a low-resolution, lower quality Flash™-based preview of the video presentation. The preview video may have a watermark over it prompting the user to order a final rendered presentation. The preview screen may also show information about the status of the job that includes number of images currently replaced, number of text items currently replaced, name of the uploaded or chosen audio file, and the like.

Jobs are generally in some state of creation. Each user could potentially have multiple unfinished jobs in progress (e.g., baby and travel pieces). Even if a User feels that he or she has finished and has placed an order for a job, with its selected template and all of the assets replaced by the user, the user may still decide to change it some more. A job thus may remain editable, except when it is deleted. Changes to jobs may be kept in the system and remembered from session to session. There is no requirement for a user to finish a job or to complete it to order in a single sitting. Instead, a user may log in, create a job, make some changes, log out, log in another day, make some more changes to the same job, log out, etcetera.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of producing a motion graphics presentation comprising:
   receiving one or more multimedia assets from a remote client;
   receiving a set of instructions from a remote client associating each said asset with a portion of a multimedia template;
   incorporating said assets into said template in accordance with said set of instructions and rendering a resulting motions graphics presentation; and
   receiving a user skill level indicator and transmitting a first asset incorporation interface to said remote client if said skill level indicator corresponds to a first skill level and transmitting a second asset incorporation interface to said remote client if said skill level indicator corresponds to a second skill level.

2. A web-based system for producing a motion graphics presentation comprising:
   means for receiving one or more multimedia assets from a remote client;
   means for receiving a set of instructions from a remote client associating each said asset with a portion of a multimedia template;
   means for incorporating said assets into said template in accordance with said set of instructions and for rendering a resulting motions graphics presentation;
   means for receiving a user skill level indicator and for transmitting a first asset incorporation interface to said remote client if said skill level indicator corresponds to a first skill level and for transmitting a second asset incorporation interface to said remote client if said skill level indicator corresponds to a second skill level.

3. A web-based system for producing a motion graphics presentation comprising:
   a front-end server that receives one or more multimedia assets and a set of instructions for associating each said asset with a portion of a multimedia template from a remote client; and
   a render server that incorporates said assets into said template in accordance with said set of instructions and renders a resulting motions graphics presentation;
   wherein said front-end server further comprises means for receiving a user skill level indicator and for transmitting a first asset incorporation interface to said remote client if said skill level indicator corresponds to a first skill level and for transmitting a second asset incorporation interface to said remote client if said skill level indicator corresponds to a second skill level.

* * * * *